United States Patent
Franklin et al.

(10) Patent No.: US 6,697,742 B1
(45) Date of Patent: *Feb. 24, 2004

(54) METHOD AND APPARATUS FOR TESTING ELECTROMAGNETIC FLOWMETERS

(75) Inventors: Bryan Raymond Franklin, Gloucestershire (GB); Colin Edward Undery, Haardwick (GB)

(73) Assignee: ABB Kent-Taylor Limited (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/785,009

(22) Filed: Jan. 17, 1997

(51) Int. Cl.[7] .................................................. G01F 1/58
(52) U.S. Cl. ...................... 702/45; 702/100; 702/104; 73/861.11
(58) Field of Search ................... 702/45, 47, 50, 702/53, 64, 65, 79, 100, 104, 107, 116, 117, 124, 182, 183, 189; 73/1.16, 1.34, 861.11–861.17, 861.08; 324/222, 239, 241, 262, 520, 522, 523, 525, 527, 546, 547, 226, 228, 237, 238, 240, 202, 234, 140 D

(56) References Cited

U.S. PATENT DOCUMENTS

| | | | |
|---|---|---|---|
| 4,520,650 A | 6/1985 | Palmer et al. ................. | 73/134 |
| 4,676,112 A | 6/1987 | Uematsu et al. ......... | 73/861.17 |
| 4,784,000 A | * 11/1988 | Gaertner ................... | 73/861.12 |
| 5,207,105 A | 5/1993 | Fukunaga et al. ....... | 73/861.12 |
| 5,351,554 A | * 10/1994 | Budmiger ................ | 73/861.17 |
| 5,627,475 A | * 5/1997 | Strosser ..................... | 324/546 |
| 5,639,970 A | * 6/1997 | Schulz ..................... | 73/861.16 |
| 5,751,535 A | * 5/1998 | Garcia-Gutierrez et al. ....................... | 73/861.11 |

FOREIGN PATENT DOCUMENTS

| | | |
|---|---|---|
| EP | 0 915 324 | 5/1999 |
| GB | 2236394 | 4/1991 |
| GB | 2333161 | 7/1999 |

* cited by examiner

Primary Examiner—Hal Wachsman
(74) Attorney, Agent, or Firm—Hodgson Russ LLP

(57) ABSTRACT

An electromagnetic flowmeter is tested and calibrated in situ by measuring the impedance of the drive coil, and the isolation to ground impedance of the coil and of the flowmeter sensor electrodes. Testing is effected by portable field equipment or by a built-in test equipment facility with the flowmeter transmitter.

22 Claims, 3 Drawing Sheets

METHOD AND APPARATUS FOR TESTING ELECTROMAGNETIC FLOWMETERS

BACKGROUND OF THE INVENTION

This invention relates to the calibration of flow meters.

The increasing need of companies such as water utilities to comply with BS5750 (ISO9001) is forcing them to perform regular routine checks on all their equipment. In the case of a free-standing or hand held instrument this is not difficult; it is sent away to a calibration house annually for a calibration check and issue of an appropriate certificate. The case of an installed flowmeter is not so easy. The transmitter can be checked with a simulator which can itself be checked by the manufacturer to BS5750. The sensor however, at present, must be removed from the pipeline (and possibly from under the ground) and returned to a test facility for wet calibration checking.

Furthermore, in some markets such as the U.S.A. and Canada, there is some reluctance to accept electromagnetic flow meters as measuring devices since currently they cannot be calibrated in situ. There is a preference for Venturi tubes, the performance of which can be measured directly.

SUMMARY OF THE INVENTION

It is an object of at least the preferred embodiments of the present invention to avoid the foregoing problem and perceived disadvantage of electromagnetic flowmeters.

In one aspect, the invention provides a method of in situ testing of an electromagnetic flowmeter comprising measuring at least two electrical parameters (preferably substantially independent parameters) of the sensor coil circuit, comparing the measured parameters to stored parameters, and determining whether the calibration of the flowmeter is accurate based on the results of the comparison. This may allow calibration drift to be assessed reliably.

The at least two electrical parameters preferably include a measure of ohmic resistance and a measure of inductance of the sensor coil; these parameters together may give reliable characterisation of the coil. Impedance and other parameters are preferably measured according to one of the aspects below.

Optionally a measure of losses in the coil is used in said determining, for example in addition to ohmic resistance and inductance; this can further improve detection of of changes in the coil properties.

Preferably, the stored parameters comprise parameters measured from the same flowmeter at an earlier time. Storing parameters for an individual flowmeter, for example during manufacture or initial calibration, may enable a more accurate determination of changes in meter properties that is less sensitive to manufacturing tolerances.

However, the stored parameters may comprise parameters defined for a batch of the flowmeters, for example on the basis of mean or predicted parameters for a model or a batch of meters of a particular model; this reduces the amount of data that need be stored.

Determination of the parameters preferably includes measuring an exponentially-changing current (or related variable) through a coil and deriving a time-constant therefrom, for example according to one of the following aspects.

According to another aspect of the invention there is provided a method of in situ testing of an electromagnetic flowmeter comprising determining the ohmic resistance of an energising coil thereof, measuring an exponentially-changing current across the coil, or a variable related thereto, deriving a time constant therefrom and determining the inductance of the coil from the time constant and the ohmic resistance.

In an apparatus aspect the invention provides electromagnetic flowmeter testing apparatus comprising means for determining the ohmic resistance of an energising coil of the flowmeter, means for providing an exponentially-changing current in the coil, means for measuring the current or a variable related thereto, means for deriving a time constant therefrom and means for determining the inductance of the coil from the time constant and the resistance.

The exponentially changing current may be produced by effecting a step change in a voltage applied to the coil.

The step change may be produced by removing the applied voltage.

Preferably the ohmic resistance is ratiometrically determined by reference to a resistor of known value in series with the coil.

The invention additionally may include measuring one or more of the following:

the isolation-to-ground impedance of the sensor coil;
the isolation-to-ground impedance of a sensor electrode of the flowmeter;
the eddy current resistance or loss component of the flowmeter.

Thus the method may include repeating the measurement of the exponentially-changing current or a variable related thereto later in time than the first measurement, and employing the two measurements and the times thereof either to derive an eddy current resistance of the flow meter, or to correct the determined value of the coil inductance for the effects of the resistance.

The method then preferably comprises measuring the elapsed times at which the measurements are taken after the step voltage change is effected, and utilising the elapsed times in the derivation of correction resistance.

In a further aspect the invention thus comprises a method in-situ testing a flowmeter comprising measuring an exponentially changing current in an energising coil of the flowmeter or a variable related thereto at two known time intervals from a datum and deriving from the measurements and time intervals an eddy current resistance of the flowmeter.

In a yet further aspect the invention provides a method of testing an electromagnetic flowmeter comprising applying to a component thereof an AC test signal of a frequency equal to that of a drive signal applied to an energising coil of the flowmeter during normal operation thereof, the test signal producing in the circuit a response characteristic of an impedance of the component and measuring the response by means of sensing means of the flowmeter which during normal operation senses a signal characteristic of fluid flow through the flowmeter.

In yet another aspect there is provided electromagnetic flowmeter testing apparatus comprising means for applying to a component thereof an AC test signal of a frequency equal to that of a drive signal applied to an energizing coil of the flowmeter during normal operation thereof, so as to produce in the circuit a response characteristic of an impedance of the component and means for supplying the response to sensing means of the flowmeter which during normal operation senses a signal characteristic of fluid flow through the flowmeter, whereby the sensing means measures the response.

The component may be an electrode and the impedance may be the isolation impedance thereof.

Alternatively or in addition the component may be the energising coil of the flowmeter, and the impedance in the isolation impedance of the coil.

The AC test signal may be obtained from the drive signal.

The test apparatus of the invention may be packed in portable form for use on site to test installed flowmeters.

The apparatus also may be incorporated into the flowmeter (which term includes its immediately adjacent drive and transmitter circuitry) and may be configured to operate automatically at intervals based either on time or on the total volume of fluid which has passed through the meter. Thus a self-testing and self-calibrating meter can be provided.

The invention also provides apparatus for testing an electromagnetic flowmeter comprising means for measuring at least two electrical parameters of the sensor coil circuit, means storing predetermined values for the at least two electrical parameters, means for comparing the stored parameters to the measured parameters, and means for outputting an indication of whether the flowmeter is within calibration based on the results of the comparison. The output may be visual or audible, for example at the time of testing, or the results may be output as data, for later evaluation.

The apparatus is preferably arranged to carry out testing according to one or more of the above method aspects, and may incorporate further features of the above apparatus aspects.

The invention now will be described merely by way of example with reference to the accompanying drawings, wherein:

DETAILED DESCRIPTION OF THE INVENTION

Figure 1:
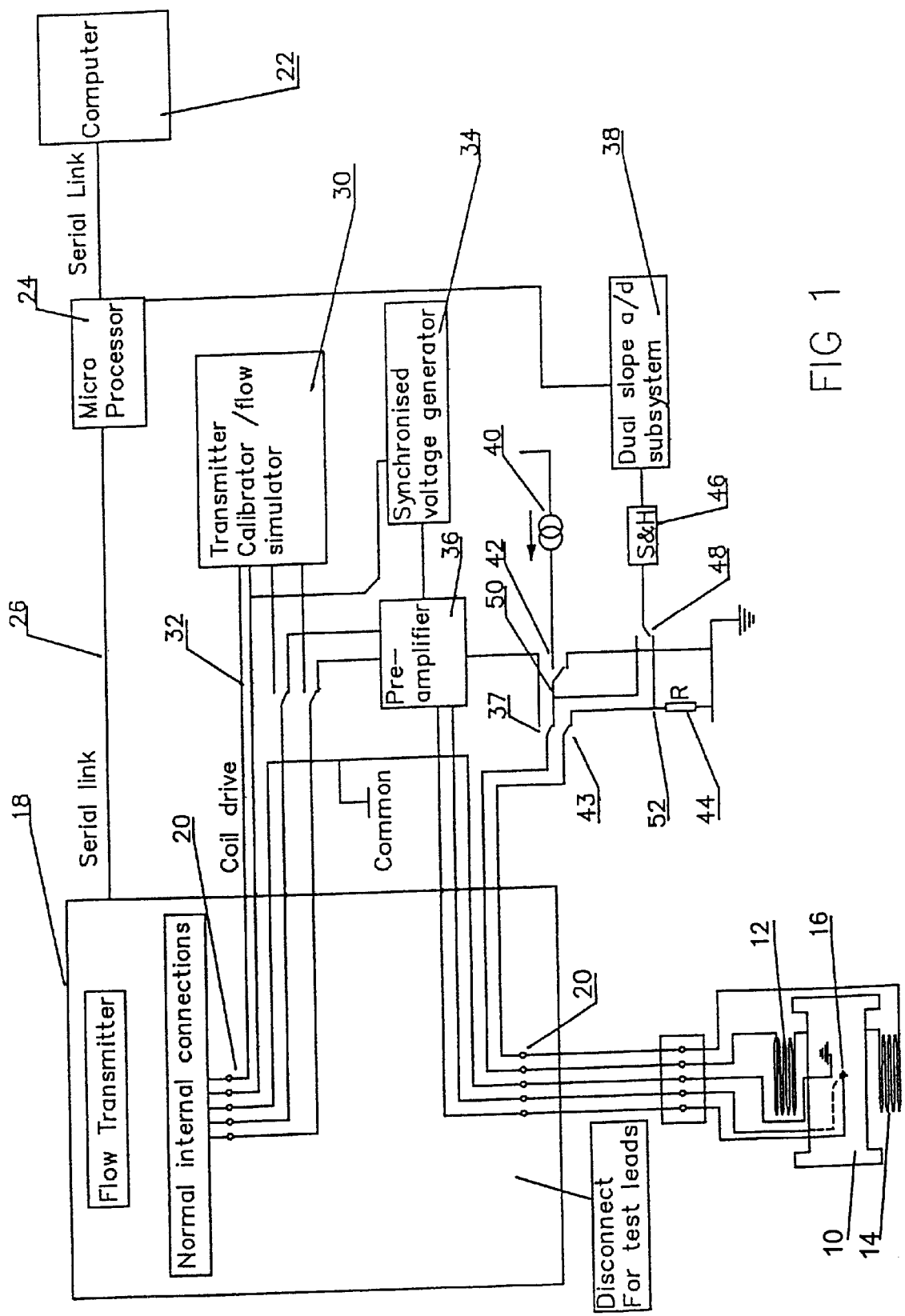
FIG. 1 shows diagrammatically the testing of a flowmeter in accordance with the invention.

In the drawing, a conventional electromagnetic flowmeter comprises a duct 10 through which a flow of conductive fluid to be measured passes, an energising coil disposed usually in two parts 12, 14 on opposite sides of the duct to generate a magnetic field in the fluid and a pair of electrodes 16 (only one shown) disposed orthogonally to the magnetic field to detect the voltage included thereby in the flowing fluid.

The flowmeter is connected to a transmitter 18 which in normal use amplifies the output signal from the electrodes, perhaps performs preliminary signal processing, and delivers the signal to remote equipment. The transmitter 18 is often mounted on or adjacent to the pipe in which the meter is fitted.

The connection between the flowmeter 10 and the transmitter 18 is a via a detachable connector 20 (shown separated) which enables field test equipment described hereafter to be interposed between the flowmeter and the transmitter. The test equipment also includes a portable (laptop) computer 22 and microprocessor 24 connected via a serial link 26 to the transmitter 18. The portable computer 22 is supplied with data, for example on a floppy disk, containing reference values of electrical parameters (ohmic resistance, inductance, insulation resistance) for the meter under test. These are supplied by the manufacture, and are based on tests performed on the meter itself, or on model values for a range of simple meters.

For testing, the transmitter 18 is disconnected from the remote equipment to which it normally supplies its output, arrangements first having been made to ensure that the remote equipment is not deranged by the loss of the signal. For example, the computer can provide the remote equipment with a signal equal to the last output of the transmitter before interruption. The transmitter can then be tested and calibrated by supplying it with simulated inputs from calibrator/simulator 30. The coil drive signal of the transmitter is converted by a resistor network into a voltage which can be varied on demand by the simulator 30. The transmitter coil drive signal for the energising coils 12 of the flowmeter also are supplied to the calibrator 30 for checking, via lines 32.

To test the flowmeter, the test equipment contains facilities to check the energising (drive) coil resistance, its inductance and its insulation (isolation to ground). The isolation of the electrodes 16 also is checked.

The test equipment includes a voltage generator 34 which derives an AC test current from the coil drive signal on line 32. The test current, which is synchronous with the drive signal, is applied to each electrode 16 in turn, the coil 12, 14 having first been disconnected. The resulting voltage developed at the electrode 16 is then measured by the transmitter 18 via a preamplifier 36.

Because the voltage is synchronous with the coil drive signal it is similar to the signal produced by the electrodes 16 when a flow is being measured. The transmitter then treats the voltage as a flow signal and produces an output on line 26 to the computer 22. Suitable calibration software in the computer converts the output to an indication of the isolation-to-ground impedance of the electrode 16. The test is then repeated for the other electrode.

A similar technique is adapted to test the isolation-to-ground impedance of the coil 12, 14. A voltage having the same frequency as the coil drive signal is applied by the voltage simulator 34 to the unterminated coil via a switch 37 and the resulting current to ground is measured by the transmitter 18 as if it were a flow measurement signal. The computer 22 interprets the transmitter output as the isolation to ground impedance of the coil.

The inductance of the drive coil 12, 14 is measured as follows:

A dual slope analog to digital converter system 38 is implemented by a standard analog subsystem chip in conjunction with the microprocessor 24. The inductance is measured by this system in three distinct phases.

1) The drive coil circuit 12, 14 is connected to a constant current source 40 via a relay 42. The current flows through the drive coil and returns to earth via a switch 43 and a resistor 44. A sample and hold amplifier 46 has its input connected via a switch 48 to point 50. The output of the sample and hold amplifier is supplied to the A/D converter 38. The sample and hold amplifier 46 operates in sample mode such that its output tracks its input at all times. The A/D converter 38 thus measures the total voltage across the coil 12, 14 and the resistor 44.

2) The sample and hold input is now connected via switch 48 to point 52. The A/D converter 38 now measures the voltage on resistor 44 only, at the same current. From the ratio of this voltage and the voltage measured in 1) above, together with knowledge of the value R of resistor 44 the computer 22 can calculate the precise value of the resistance of the coil 12, 14.

3) The top of the coil (point 50) is now disconnected from the current source and connected to ground via switch 42. The current in the circuit decays exponentially with a time constant of Lc/Rt, where Lc is the inductance of the coil, and Rt, is the total resistance of the circuit, including resistor 44. After a precisely timed interval (t), the sample and hold amplifier 46 is placed into its hold state, and the A/D converter 38 then measures the voltage stored by it. The current in the circuit at time t is given by:

$$i = I' e^{(-t \cdot Rt/Lc)}$$

from which the inductance can be found as $$L = -Rt \cdot t / Ln(i/I)$$

where L is the inductance of the coil 12, 14

Rt is the total resistance of the circuit t is the time between the switch 42 grounding point 50 and the sample and hold amplifier to hold i is the current measured at time t I is the initial current The inductance then can be found from the ratio of i and, the value of Rt having been ratiometrically determined from resistor 44. Hence the resulting measurement of inductance is not dependent on any circuit parameters other the reference resistor 44 and the precision of the time t, both of which can be controlled to the required degree of accuracy. Of course the A/D connector 38 must be sufficiently linear for the accuracy required.

If all of the foregoing tests give results within limits then it will have been established without recovering the meter from its pipeline that the flowmeter sensor coil and the transmitter are functionally correct, that the transmitter is within calibration and that the flowmeter sensor calibration has not drifted.

The test results are stored on disc by the computer, and an ISO900I (B5 5750) certificate is printed for retention by the meter user.

All of the test routines may be made automatic, and the necessary test circuitry (including computing capability equivalent to the PC 22) integrated into the transmitter 18, thereby giving the flowmeter installation a BITE (built-in test equipment) capability. Such equipment may be programmed to operate at pre-set intervals dependant on elapsed time or the total fluid flow past the meter if an integrating function is present. Alternatively the test routine may be controlled from the remote equipment to which the transmitter 18 is connected.

Figure 2:
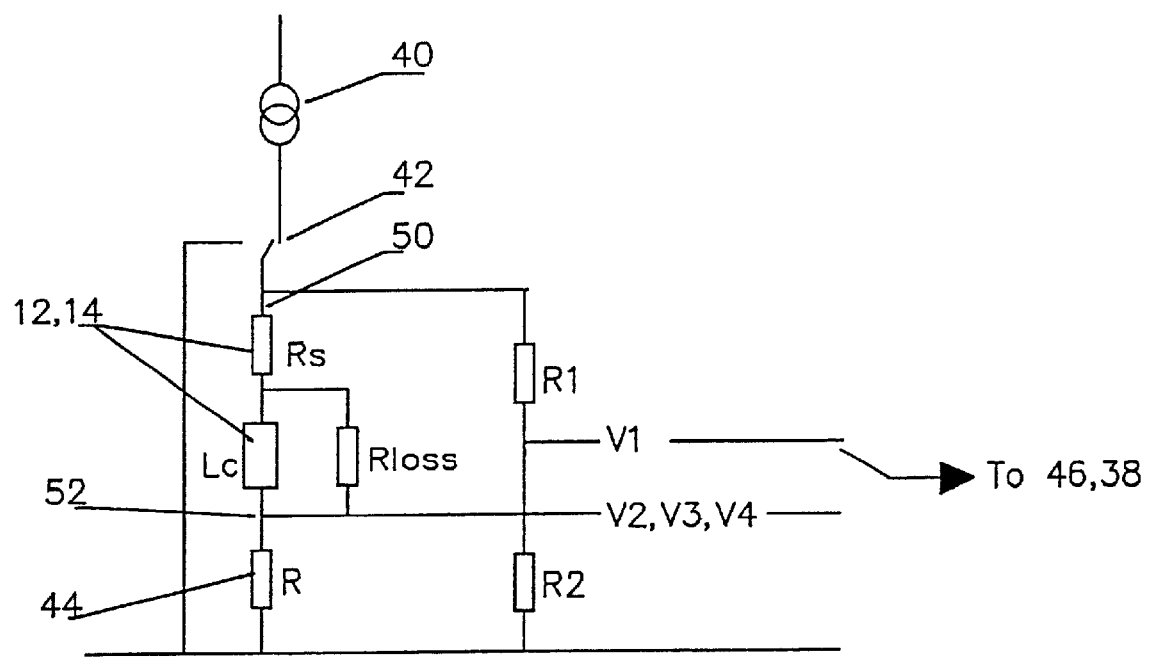
FIG. 2 illustrates an alternative circuit arrangement according to the present invention.
Figure 3:
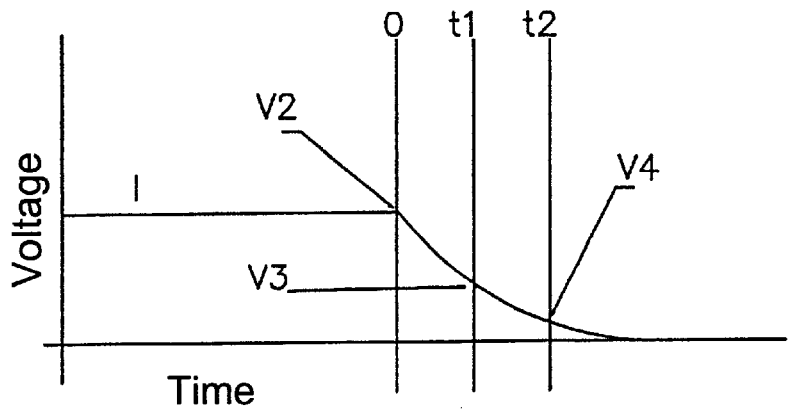
FIG. 3 is a graph illustrating an aspect of the present invention.
Figure 4:
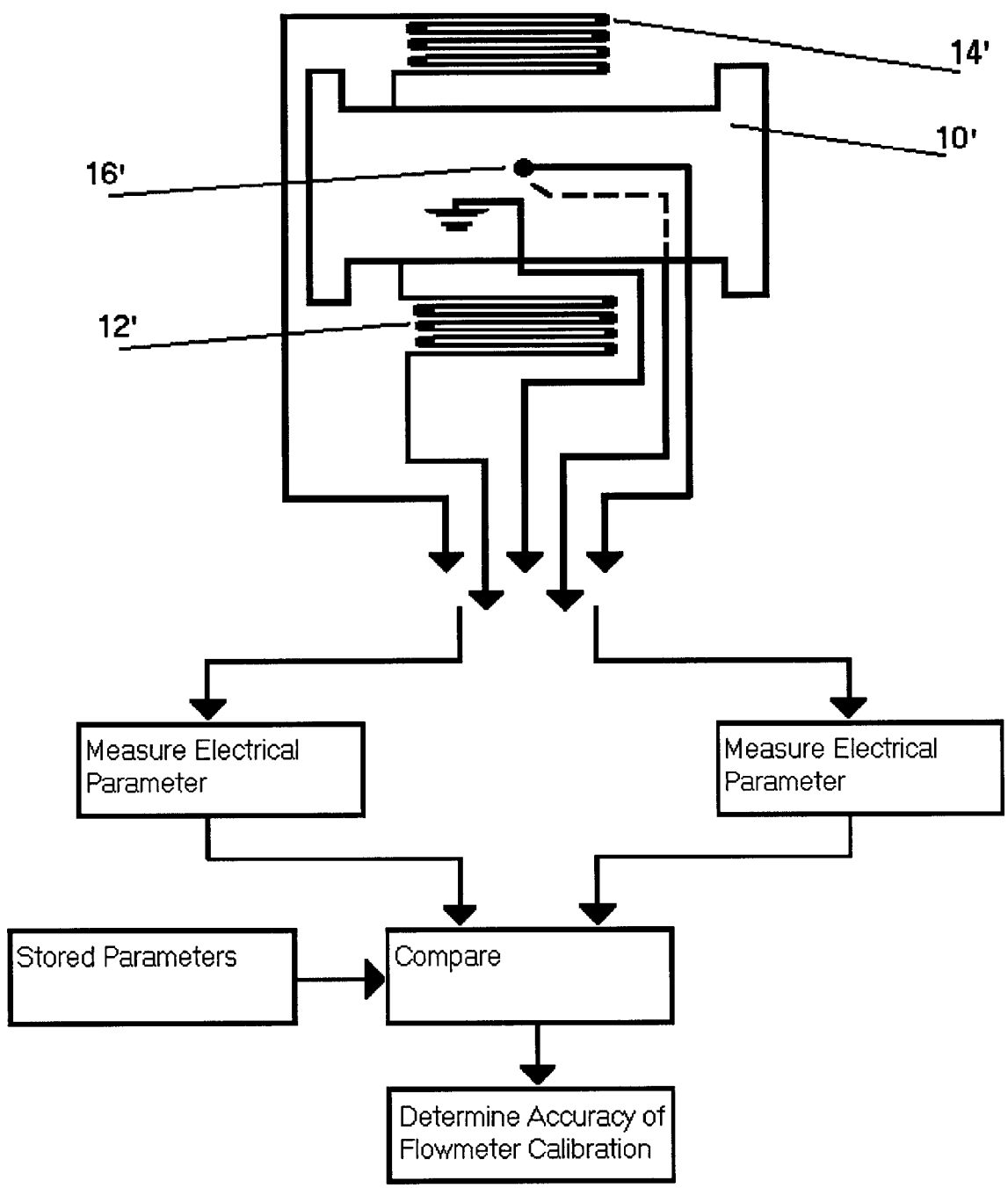
FIG. 4 is a flow chart illustrating the method of the present invention.

The test routine may be further refined as shown in FIGS. 2 and 3. In FIG. 2, the resistive and inductive components of the energising coil are shown separately and respectively as Rs and Lc. Other components bear the same reference numerals as in FIG. 1.

A relatively large voltage appears at point 50 across the coil 12, 14 and resistor 44 when the switch 42 connects the coils 12,14 to the constant current source 40. This voltage may exceed the capacity of the sample and hold circuit 46 or the A/D converter 38, and therefore the voltage supplied to those components from point 50 via switch 48 is stepped-down to $V_1$ by a potential divider $R_1$, $R_2$. Voltage measurements from point 52 are taken directly, as in FIG. 1.

As already described, the resistance Rs of the energising coil is determined from the ratio of the voltages at point 50

$$\frac{(V_1 * R_1 + R_2)}{R_2}$$

and point 52 ($V_2$), under steady-state conditions.

The energising coil 12,14 can be considered as an ideal inductor $L_c$ which has in parallel with it a resistive term Rloss which represent the heading losses due to eddy currents in the flowmeter tube. This assumes a coupling coefficient close to unity and thus is a simplification, but it still improves the accuracy of the determination of $L_c$, as will be apparent hereafter. The flowmeter tube is only coupled by transformer action to the coil and under steady state conditions therefore all the current I flows through $L_c$. When the switch 42 is closed however, to disconnect the current source and short to coil to earth, the stored field collapses. Then the current flows through Rs and Rm, and by transformer action some flows through Rloss also.

By making measurements of the decay current at different times $t_1$ and $t_2$ as shown in FIG. 3, we can derive two values of the inductance as below, but these must be equal:

$$L = \frac{-t_1 * V1/V2 * R/a}{\ln(a) + \ln(V3/V2)} = \frac{-t_2 * V1/V2 * R/a}{\ln(a) + \ln(V4/V2)} \quad (1)$$

Where $$a = \frac{Rs + Rloss + R}{Rloss} \quad (2)$$

We can then derive from (1)

$$\ln(a) = \frac{t_1 * \ln(V4/V2) - t_2 * \ln(V3/V2)}{t_2 - t_1}$$

and, substituting back $$L = \frac{-t_1 * V1/V2 * R/a}{\ln(a) + \text{Log}(V3/V2)}$$

and from (2)

$$Rloss = \frac{Rs + R}{a - 1}$$

First the measurement is made at time $t_1$ after closure of switch 42, and the values for V1, V2 and V3 are derived. The measurement is then repeated at a time of $t_2$, and values for V1', V2' and V4 are obtained. V1', V2' may be slightly different to V1 and V2 (due to drift in the constant current source with time), but the formulate are modified slightly below to accommodate this:

$$L = \frac{-t_1 * V1/V2 * R/a}{\ln(a) + \ln(V3/V2)} = \frac{-t_2 * V1/V2 * R/a}{\ln(a) + \ln(V4/V2')}$$

$$\ln(a) = \frac{t_1 * \ln(V4/V2') - t_2 * \ln(V3/V2)}{t_2 - t_1}$$

Having thus determined Rloss, the calculation of L in paragraph 3 above can be repeated with the value of Rt revised to include Rloss.

Each feature disclosed in this specification (which term includes the claims) and/or shown in the drawings may be incorporated in the invention independently of other disclosed and/or illustrated features.

The text of the abstract as filed herewith is included in the specification by reference.

What is claimed is:

1. A method of in situ testing of an electromagnetic flowmeter having a sensor coil circuit comprising a coil having coil properties, the method comprising:

measuring at least two electrical parameters of the sensor coil circuit which enable detection of changes in the coil properties, comparing the measured parameters to stored parameters of the flowmeter, and determining whether the calibration of the flowmeter is accurate based on the results of the comparison so that the flowmeter is tested in situ.

2. The method according to claim 1, wherein said at least two electrical parameters include a measure of ohmic resistance and a measure of inductance of the coil of the sensor coil circuit.

3. The method according to claim 1 or claim 2, wherein the measure of electrical losses in said coil of said sensor coil circuit is used in said determination.

4. The method according to claim 1 wherein the stored parameters comprise parameters measured from the same flowmeter at an earlier time.

5. The method according to claim 1 further including a batch of flowmeters and wherein the stored parameters comprise parameters defined for the batch of flowmeters.

6. The method as claimed in claim 1, further comprising selectively measuring the isolation-to-ground impedance of the sensor coil circuit;

the isolation-to-ground impedance of the sensor electrode of the flowmeter; and an eddy current resistance or loss component of the flowmeter.

7. The method according to claim 1, wherein at least one of the electrical parameters includes measuring an exponentially changing variable selected from the group consisting of: a voltage across a coil, a current through a coil, a variable indicative of said voltage of current; and determining a time constant from the exponentially changing variable.

8. A method of in situ testing of an electromagnetic flowmeter by obtaining electrical parameters thereof comprising determining the ohmic resistance of an energizing coil thereof, measuring an exponentially-changing current in the coil or a variable related thereto, deriving a time constant therefrom, determining the inductance of the coil from the time constant and the ohmic resistance, and determining the accuracy of calibration of the flowmeter in situ using the foregoing measurements of the resistance and inductance of the coil.

9. The method as claimed in claim 8, where the exponentially changing current is produced by effecting a step change in a voltage applied to the coil.

10. The method as claimed in claim 9, where the step change is produced by removing the applied voltage.

11. The method as claimed in claim 9, comprising measuring the elapsed times at which said measurements are taken after the step voltage change is effected, and utilizing said elapsed times to derive the eddy resistance of the flowmeter or to correct the determined value of the coil inductance based on the time dependence of said measurements.

12. The method as claimed in claim 8, wherein the ohmic resistance is determined by the ratio of the ohmic resistance of the coil to a resistor of known value in series with the coil.

13. A method of in situ testing a flowmeter comprising measuring an exponentially changing current in an energizing coil of the flowmeter at two known time intervals from a datum and deriving from said measurements and time intervals an eddy current resistance of the flowmeter so that the flowmeter is tested in situ.

14. An electromagnetic flowmeter testing apparatus wherein electrical parameters of the flowmeter are obtained comprising means for determining the ohmic resistance of an energizing coil of the flowmeter, means for providing an exponentially-changing current in the coil, means for measuring said exponentially-changing current, means for deriving a time constant from the exponentially changing current, means for determining the inductance of the coil from the time constant and the ohmic resistance, and means for testing the accuracy of the calibration of the flowmeter in situ using the foregoing measurements of the resistance and inductance of the coil.

15. A method of testing an electromagnetic flowmeter comprising applying to an electrically-responsive component thereof an AC test signal of a frequency equal to that of a drive signal applied to an energizing coil of the flowmeter during normal operation thereof, said drive signal producing in a circuit of the flowmeter a response characteristic of an impedance of said electronically responsive component, and measuring said response characteristic by means of a sensing means of the flowmeter which during normal operation senses a signal characteristic of fluid flow through the flowmeter.

16. The method as claimed in claim 15, wherein the electrically responsive component is an electrode and the impedance is the isolation impedance thereof.

17. The method as claimed in claim 15, wherein the electrically responsive component is the energising coil of the flowmeter, and the impedance is the isolation impedance of the energizing coil.

18. The method as claimed in claim 15, wherein the AC test signal is obtained from the drive signal.

19. An electromagnetic flowmeter testing apparatus comprising means for applying to an electrically responsive component thereof an AC test signal of a frequency equal to that of a drive signal applied to an energizing coil of the flowmeter during normal operation thereof, so as to produce in a circuit of the flowmeter a response characteristic of an impedance of said electrically responsive component, and means for supplying said response characteristic to a sensing means of the flowmeter which during normal operation sense a signal characteristic of fluid flow through the flowmeter so that the sensing means measures said response characteristic.

20. The electromagnetic flowmeter testing apparatus as claimed in claim 19 operatively coupled to the energizing coil of an electromagnetic flowmeter.

21. Apparatus for testing an electromagnetic flowmeter having a sensor coil circuit, the apparatus for testing comprising means for measuring at least two electrical parameters of the sensor coil circuit, means storing predetermined values for said at least two electrical parameters, means for comparing the stored predetermined values for the at least two electrical parameters to the measured parameters, and means for outputting an indication of whether the flowmeter is within calibration based on the results of the comparison.

22. A method of in situ testing of an electromagnetic flowmeter comprising determining the ohmic resistance of an energizing coil thereof, measuring an exponentially-changing current in the coil or a variable related thereto, deriving a time constant therefrom, determining the inductance of the coil from the time constant and the ohmic resistance so that the flowmeter is tested in situ, repeating the measurement of the exponentially-changing current later in time than the first measurement, and employing said current measurements and the times thereof either to derive an eddy current resistance of the flowmeter, or to correct the determined value of the coil inductance for the effects of said eddy current resistance.

* * * * *

UNITED STATES PATENT AND TRADEMARK OFFICE
CERTIFICATE OF CORRECTION

PATENT NO. : 6,697,742 B2  Page 1 of 1
DATED : February 24, 2004
INVENTOR(S) : Bryan Raymond Franklin et al.

It is certified that error appears in the above-identified patent and that said Letters Patent is hereby corrected as shown below:

Title page,
Item [*] Notice, should read a patent Term Adjustment of Zero (0) days.

Signed and Sealed this

Twelfth Day of April, 2005

JON W. DUDAS
*Director of the United States Patent and Trademark Office*